W. PATTERSON.
Millstone-Driver.
No. 215,662. Patented May 20, 1879.
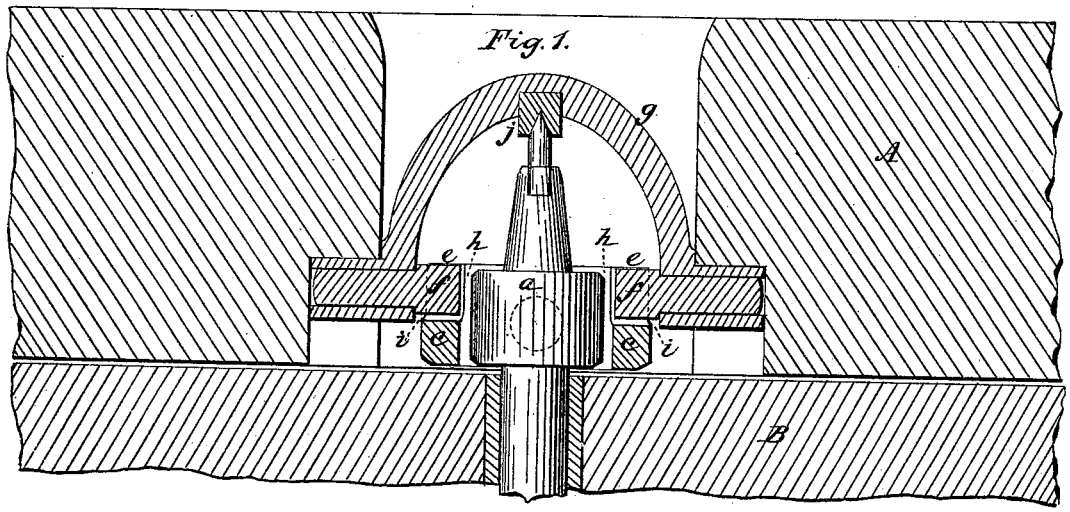
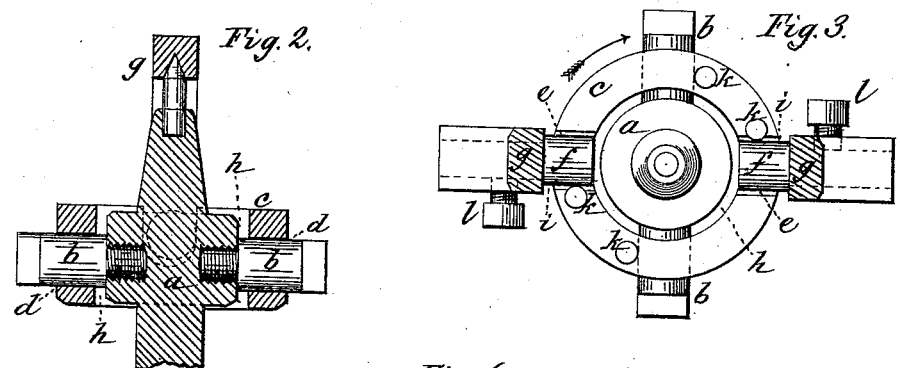
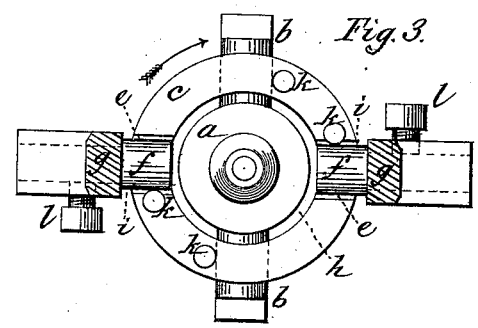
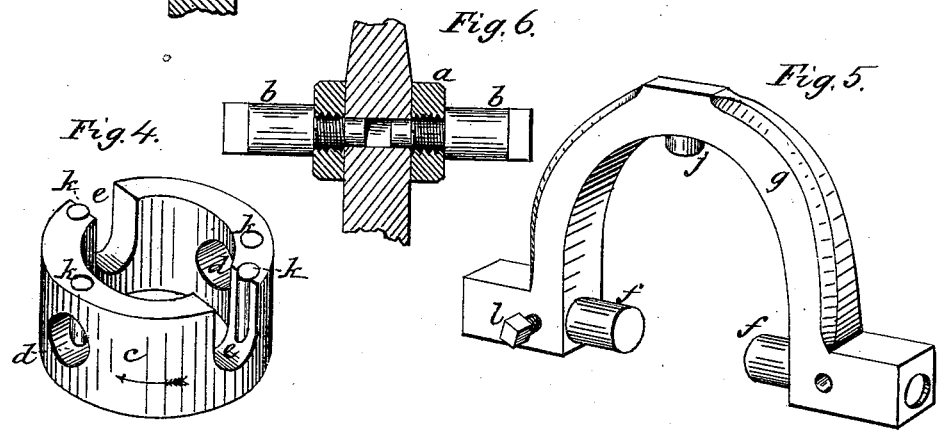
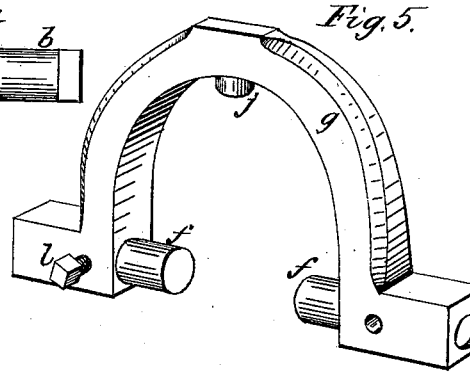
Witnesses:
William Patterson
Inventor:
by Johnson & Johnson
Att'ys

UNITED STATES PATENT OFFICE.

WILLIAM PATTERSON, OF CONSTANTINE, MICHIGAN.

IMPROVEMENT IN MILLSTONE-DRIVERS.

Specification forming part of Letters Patent No. 215,662, dated May 20, 1879; application filed October 1, 1878.

*To all whom it may concern:*

Be it known that I, WILLIAM PATTERSON, of Constantine, in the county of St. Joseph and State of Michigan, have invented certain new and useful Improvements in Driving and Balancing Millstones; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to devices for driving and balancing millstones; but my improvement is more particularly in the driving device, which, however, by its peculiar construction and adaptation, serves to balance the stone and to maintain such balance with great certainty.

I design, by my improvements, to obtain a perfect equalization of the force in driving, almost entire absence of friction of the driving parts, a balancing of the stone as nearly certain and permanent as possible, with a simple and durable construction of the working parts, giving results in use more satisfactory than any other method of driving of which I have any knowledge.

The driving-spindle has a fixed collar, with opposite projecting steel pins, upon which a metal driving-ring is fitted and supported, and having in its upper edge deep opposite slots to receive corresponding steel pins on a bail, which carries and supports the runner upon the "cock-point" of the driving-spindle. These bearing and driving pins are at right angles to each other; and there is an annular space between the collar and the driving-ring, to allow said ring not only to have a sliding movement upon the collar-pins in the line of their projection, for a purpose to be presently stated, but to oscillate thereon at right angles to such sliding movement and prevent clogging, while a similar space between the driving-ring and the yoke ends prevents clogging, allows the same movements of the bail and its runner, thus insuring the adjustment of the driver to the runner in any direction, a free motion to the runner under all circumstances, and its perfect adjustment to the bed-stone-surface.

The side movement of the driving-ring upon the collar-pins is important, in order that said ring may adjust itself to the yoke-driving pins, thereby rendering it certain that the driving-ring will operate on both the yoke-pins simultaneously, which would not be the case were it not for this lateral movement of the driver.

This construction gives four points of contact or bearing of the driving-ring with the steel pins of the collar and bail; and in order to reduce the friction of these bearing-points to the minimum, and prevent any cramping of the runner or departure from its true horizontal position, I arrange removable steel plugs in sockets in the driving-ring, so as to form the driving side bearings for the steel pins in the collar and bail, and which steel plugs can be removed and replaced by new ones should their bearing-sides become worn or flattened by use.

Referring to the drawings, Figure 1 represents a vertical section of a runner and bed-stone with my improved driving and balancing device applied thereto; Fig. 2, a similar section of the driver, taken at right angles to Fig. 1; Fig. 3, a top view of the driving-ring and the spindle-collar, in connection with the yoke; Fig. 4, the driving-ring; Fig. 5, the bail, and Fig. 6 a section showing the manner of applying my device to spindles now in use.

My improvements are applicable to the spindles of grinding-mills now in use and operating by any of the ordinary drivers.

In adapting my said improvements for use in such cases, I take the spindle and turn it to any size that it will work, and secure thereon a tightly-fitting collar, $a$, by means of two opposite pins, $b\ b$, of hardened steel, screw-threaded to a shoulder, which is drawn up firmly to the outside surface of the collar, while the inner ends of the pins, being of less diameter, fit into corresponding shallow holes bored in the spindle to prevent the collar from turning, as shown in Fig. 6.

In spindles made expressly for my improved device the collar $a$ is turned thereon, and the steel pins screwed in holes formed therein, as shown in Fig. 2.

The driver consists of a metallic ring, $c$, having opposite slots or cylindrical holes $d\ d$ formed at or near its lower edge to receive the steel pins $b\ b$ of the spindle, and by which said ring is supported, and having also deep opposite slots $e\ e$ in its upper edge, in positions at right angles to its lower slots or holes, $d\ d$, to receive inward-projecting steel pins $f\ f$ of the runner-bail $g$, and by which said runner is driven.

In practice there is a space, $h$, of about half an inch between the circumference of the spindle-collar $a$ and the inner surface of the driving-ring $c$, and a similar space, $i$, between the outer circumference of the driving-ring and the inner vertical sides of the lower ends of the bail, so that the runner A being suspended by the bail $g$ upon the cock-point of the spindle, fitting into a steel bearing, $j$, at the crown of said bail, allows the runner to adjust itself to the grinding-surface of the bed-stone B in any direction, as the pins, in connection with the cock-point bearing, form a sort of universal joint.

The inner annular space, $h$, allows the driving-ring to slide upon the pins $b\ b$ from one side of the collar to the other, and the outer space, $i$, allows the runner to move laterally toward and from the driving-ring upon the pins $f\ f$, thereby preventing all tendency to clog in the eye of the runner, and to effect a perfect balancing.

The driving-pins $b\ b$ fit their bearings $d$ snugly, while the upper slots, $e\ e$, are slightly wider than the diameter of the pins $f\ f$, as in Fig. 3, in order to give an equal amount of resistance to the bail-driving pins at the same time, which is obtained by the sliding movement of the driver upon the spindle-pins.

It is important that the driving sides of all the points of contact of the pins in the ring should be as free from wear as possible; and for this purpose vertical sockets are formed in the driving-ring, into which are fitted cylindrical steel plugs $k$, Figs. 3 and 4, in positions to form one side of the ring-bearings, so that the pins and plugs only touch each other by their convex surfaces of hard steel, effectually avoiding the friction which would result were the pins in contact with flat bearings, and preventing all tendency of the runner to cramp, while causing the runner to grind equally at all points, and securing a smooth uniform motion, so important in millstones.

The steel plugs are fitted in place, so that they can be easily removed and replaced by new ones when their bearings become worn or flattened.

It may be necessary in fitting some spindles now in use with my improved driver to have the upper slots, $e$, in the driving-ring made in the bail, and the bail-pins transferred to the upper edge of the driving-ring; but the results would be the same. The spindle is driven in any suitable way, and the grinding-stones have the usual inclosing-case and other appliances necessary to their proper working. The bail may be secured to the runner in any suitable way. The pins in the bail are held in place by clamp-screws $l$, as shown in Figs. 3 and 5.

The peculiar construction of the ring-driver $c$ allows of its direct connection with the spindle and with the bail by means of cylindrical bearing-pins adapted for removal and replacement when required, and which form meeting convex bearings with steel plugs seated vertically in sockets in the rim of said ring-driver, so that they can be turned round to present new bearings for the spindle and bail-pins, or removed and replaced by new ones when worn out. This construction allows the ring-driver to have lateral play upon the pins $b\ b$, which, in addition, serve as the means of mounting the ring-driver upon the spindle. This is important, as it dispenses with the use of supplemental connecting and adjusting yokes arranged above the driver, and which tend to obstruct the eye of the runner.

The ring-driver is complete in itself for connection with the spindle and with the bail in a manner to give the proper self-adjustment to the runner in any direction, although the bail may not be set perfectly true.

The state of the art shows millstone-drivers adapted to allow of the self-adjusting action of the runner in any direction, whether the bail be set true or not; and among other devices for this purpose trunnion-yokes forming a transverse rock-shaft with angular ends and an encircling bow or ring for the spindle have been used for making a connection with the driver and bail, so that the cranked ends act against the bail or the driver, and thus balance and operate the runner.

My invention does not admit of the use of such separate cranked yoke device, or any equivalent therefor, because the ring $c$ forms the driver, the means for connecting the bail with the spindle, and the means for obtaining the proper adjustments of the runner.

I claim—

1. The driver-ring $c$, constructed substantially as described, adapted by the space $h$, open at the top and bottom, to have both a sliding and a rocking adjustment upon the pins $b\ b$, and an adjustment upon the pins $f\ f$ by the spaces $e\ e$, in combination with a bail adapted by the spaces $i\ i$ to have the adjustment with the runner described, and the spindle upon which said runner is suspended, all arranged substantially as herein set forth.

2. The ring-driver $c$, having vertical cylindrical bearing-plugs $k$, in combination with the horizontal cylindrical pins $b\ b$ of the spindle, and the horizontal cylindrical pins $f\ f$ of the bail, whereby meeting convex bearing-points $b\ k$ and $f\ k$ are obtained for the driving parts.

3. The ring-driver of a mill-spindle having opposite side openings $d\ d$, the opposite side slots $e\ e$ opening at its top, and the vertical steel cylindrical bearing-plugs $k$, adapted for use with the spindle and bail driving pins $b\ b$ and $f\ f$, substantially as herein set forth.

4. The combination, with the ring-driver $c$, constructed substantially as herein set forth, and the bail by which the runner is suspended, of the removable screw driving-pins $b\ b$, applied to the ring-driver and to the spindle, as described.

5. The bail $g$, having removable screw steel pins $f\ f$, in combination with the ring-driver $c$, having slots $e\ e$, opening at the top, for the purpose stated.

6. The millstone-driver consisting of the shouldered spindle $a$, the bail $g$, provided with removable pins $f\ f$ and mounted on the spindle, and a ring-driver, $c$, having right-angled receiving bearing-openings $d\ d$ and $e\ e$ for the spindle-pins $b\ b$ and the bail-pins $f\ f$, and adapted by the space $h$ between the spindle-hub and the ring, and the space $i$ between the bail and said ring, for operation as stated.

In testimony that I claim the foregoing I have affixed my signature in the presence of two witnesses.

WILLIAM PATTERSON.

Witnesses:
   FRED A. HULL,
   EDWARD THORNE.